(12) United States Patent
Twohig et al.

(10) Patent No.: US 10,810,147 B1
(45) Date of Patent: Oct. 20, 2020

(54) TYPE-BASED MESSAGE BUS WITH MESSAGE TYPE HIERARCHES FOR NON-OBJECT ORIENTED APPLICATIONS

(71) Applicant: EMC IP Holding Company LLC, Hopkinton, MA (US)

(72) Inventors: Aaron T. Twohig, Rathpeacon (IE); Fearghal O'Maolcatha, Lehenaghmore (IE)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 16/362,833

(22) Filed: Mar. 25, 2019

(51) Int. Cl.
*G06F 13/00* (2006.01)
*G06F 13/20* (2006.01)

(52) U.S. Cl.
CPC ...... *G06F 13/20* (2013.01); *G06F 2213/2418* (2013.01)

(58) Field of Classification Search
CPC .................. G06F 13/20; G06F 2213/2418
See application file for complete search history.

(56) References Cited

U.S. PATENT DOCUMENTS

| | | | | |
|---|---|---|---|---|
| 6,779,184 B1* | 8/2004 | Puri | ......................... | G06F 9/542 709/238 |
| 2008/0134202 A1* | 6/2008 | Craggs | ..................... | G06F 9/542 719/313 |
| 2010/0082748 A1* | 4/2010 | Banks | ...................... | G06F 9/542 709/206 |
| 2015/0281374 A1* | 10/2015 | Petersen | .................. | H04L 67/12 709/223 |
| 2015/0288636 A1* | 10/2015 | Yalavarty | ................ | H04L 51/16 709/206 |
| 2016/0212225 A1* | 7/2016 | Smith | .................... | G06F 9/5027 |
| 2017/0068578 A1* | 3/2017 | Janarthanam | ........... | G06F 9/542 |

FOREIGN PATENT DOCUMENTS

| | | | | |
|---|---|---|---|---|
| JP | 2018120537 A | * | 8/2018 | ............. H04L 67/34 |
| WO | WO-2014086143 A1 | * | 6/2014 | ....... H04L 12/40013 |

OTHER PUBLICATIONS

"Strategies for Integrating Messaging and Distributed Object Transactions" by Stefan Tai and Isabelle Rouvellou, Middleware 2000 (Year: 2000).*
Github.com., "MessageBus.ts," https://github.com/stayhard/MessageBus.ts, Retrieved: Jun. 4, 2019, 3 pages.

* cited by examiner

*Primary Examiner* — Jing-Yih Shyu
(74) *Attorney, Agent, or Firm* — Amin, Turocy & Watson, LLP

(57) ABSTRACT

Techniques are provided for providing a type-based message bus with message type hierarchies for non-object oriented languages. In an example, a type-aware message bus receives a subscription message from a subscriber that identifies an object-oriented class. The message bus determines an event channel that corresponds to the class, and subscribes the subscriber to the event channel. The message bus also determines any event channels that correspond to a subclass of the class, and subscribes the subscriber to those event channels. When a publisher publishes a message to an event channel, the message bus publishes the message to each subscriber of the event channel, which can have the effect of publishing the message to subscribers that originally subscribed to superclass event channels of the event channel.

20 Claims, 11 Drawing Sheets

US 10,810,147 B1

TYPE-BASED MESSAGE BUS WITH MESSAGE TYPE HIERARCHES FOR NON-OBJECT ORIENTED APPLICATIONS

TECHNICAL FIELD

The present application relates generally to techniques for providing a type-based message bus with message type hierarchies for non-object oriented languages.

BACKGROUND

A message bus generally can comprise a computer component that supports transmitting messages between computer components. Some message buses operate on strings. A subscriber subscribes to receive messages that are published to a specific string of characters. Then, a publisher publishes a message to a particular string of characters. Where a publisher publishes a message to the same string of characters that the subscriber is subscribed for, then the message will be sent to the subscriber.

BRIEF DESCRIPTION OF THE DRAWINGS

Numerous aspects, embodiments, objects, and advantages of the present invention will be apparent upon consideration of the following detailed description, taken in conjunction with the accompanying drawings, in which like reference characters refer to like parts throughout, and in which.

DETAILED DESCRIPTION

Overview

Figure 1:
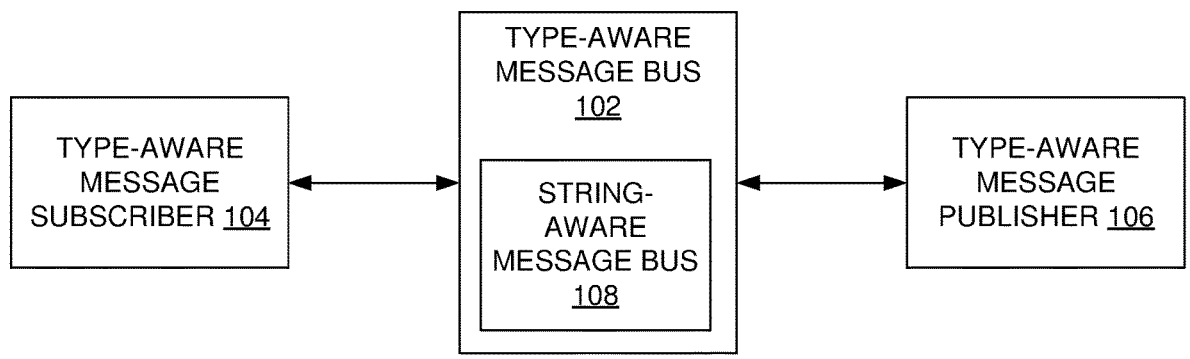
FIG. 1 illustrates a block diagram of an example computer system that can facilitate a type-based message bus with message type hierarchies for non-object oriented applications, in accordance with certain embodiments of this disclosure.

Some message buses are implemented to support string-based subscriptions with no type safety and no support for type hierarchies (e.g., AngularJS events). String-based subscription message buses can have a problem of run-time errors, with code that is cumbersome and difficult to maintain in a large-scale application. That is, problems with string-based subscription message buses can include problems with lack of type hierarchies, problems with lack of type safety, and problems with subscription and publication by string.

Regarding problems with lack of type hierarchy, if a subscriber is interested in all messages about Animals, it must then subscribe to all relevant animal strings (e.g., "Dog," "Cat," "Tiger," etc.). Whenever a new animal is added, those subscribers must update their list of strings to include the new subject (e.g., "Lion"). So, supporting new message types can involve extensive refactoring. The present techniques can provide a solution to problems with lack of type hierarchy by allowing subscribers to subscribe for messages of type Animal, which will automatically include all current and future Animal sub-types.

Regarding problems with lack of type safety, with typical JavaScript-based messaging approaches, a subscriber can subscribe for "Dog" messages, but receive a "Lion" message. That is, a publisher can send any type of object as a message payload, and any resulting error might be detected only at runtime. In contrast, the present techniques can provide a solution to problems with lack of type safety by detecting type mismatches at build time. That is, subscribers of "Cat" messages cannot receive "Dog" messages or generic "Animal" messages.

Regarding problems with subscription and publication by string, if "Dog" messages are published on a "Dog" channel, and a subscriber is subscribed to the "Dogs" channel (note the additional "s"), then that subscriber will not receive any messages, and there will be no build-time warnings or run-time warnings. A bug like this might only be found by a developer noticing the mismatch in the strings. In contrast, the present techniques can provide for publishing messages and automatically routing them to the correct subscribers based on type, so any spelling errors would be reported in an integrated development environment (IDE), or at build time.

Applications built with a JavaScript programming language usually use string-based, non-type-safe messaging mechanisms, e.g., events in an AngularJS framework. A problem of string-based routing is that there is not support for type hierarchies, so in some examples, if a subscriber is interested in all "Animal" messages, the subscriber must subscribe to all the string-based channels it is interested in, e.g., "Dog," "Cat," "Lion," "Tiger," etc.

In some examples, an AngularJS subscription mechanism does not support partial string matching, so a subscriber cannot subscribe for "Animal*" and expect to receive messages published as "Animal.Dog," "Animal.Cat," etc.

In some examples, a Rxmq JavaScript library based on RxJs does support wildcard subscriptions using the wildcard characters * and #. Using a Rxmq library, subscribing to "Animal.*'" can pick up messages on the topics "Animal.Dog" and "Animal.Cat," but not on the topic "Animal.Dog.Labrador." Then, using a Rxmq library, in some examples, subscribing to "Animal.#" can pick up all "Animal" sub-topics, but this approach does not support types, so problems of typos and difficult refactoring remain.

A library that does offer some type safety is a MessageBus.ts library. A MessageBus.ts library can provide some type safety at the point of subscription, but in some examples does not support type hierarchies or type-based publication. In some examples with a MessageBus.ts library, a type name must be provided as a string at publication time, so these examples do not solve problems associated with maintenance and runtime for string-based messaging. Additionally, since modern large-scale user interfaces typically are developed using object oriented programming, lack of inheritance support is a problem that can restrict the usefulness of a MessageBus.ts library.

A message bus according to the present techniques can run in JavaScript applications and support type based messaging, including subscription by type, publication by type, support for type hierarchies, and message type safety. In an example, a message bus is written in a Typescript programming language, then transpiled to a JavaScript programming language. The structure of a JavaScript programming language can allow the message bus to collect and store class (i.e., type) meta data at startup time, so an accurate type hierarchy can be modeled at runtime, and the class of a given object can be reliably detected. Using this information, subscription by type, publication by type, and type safety can be implemented.

Regarding subscription by type, subscribers of Animal messages can receive information about Cats, Dogs, and any currently- or newly-defined Animal sub-types. This can work by creating an AngularJS event listener for the fully qualified name of the supplied class ("com.petstore.Animal"), and child classes (e.g. "com.petstore.Dog, "com.petstore.Cat", etc.). In an example, this can be implemented by recursively examining the subclasses of the message type being subscribed for. Where a message is published to one of these subclasses' channels, a subscriber to "Animal" will receive the message.

In some examples, where a subscriber subscribes for "Dog" messages, that subscriber will not receive generic "Animal" messages or "Cat" messages, because "Animal" and "Cat" are not sub-types of "Dog."

In some examples, when a "Labrador" message is published, all subscribers of "Labrador" messages, all subscribers of "Dog" messages, and all subscribers of "Animal" messages will receive the message. This can be implemented as follows: on publication, an AngularJS event can be fired with the fully qualified class name of the message ("com.petstore.Labrador"). The subscription mechanism can have ensured that all listeners for superclasses of that message class (e.g. "Dog" or "Animal") will also be connected to this channel.

Regarding type safety, in some examples, when subscribing for a message, the subscriber must provide a listener method that will be called back and will have the message passed to it. The message bus can ensure type safety by checking that the listener method takes a parameter of a safe type. Safe types can be the type that is being subscribed to, as well as a super-type of that type, e.g., in some examples, a subscriber can subscribe for "Dog" messages and safely treat them as "Animal" messages, but not subscribe to "Animal" messages and safely treat them as "Dog" messages. This rule can be enforced using TypeScript generics. A subscription method signature can be expressed as:

public register<T extends U, U>(messageClass: {new( . . . args:any[ ]): T;}, listenerMethod: (msg: U)=>any, scope:ng.IScope, listenerObj:any)

In this example subscription method signature, if T is "Dog" and U is "Animal," this will work fine, but if T is "Animal" and U is "Dog," it will report an error, as "Animal" does not extend "Dog."

Example Architecture

The disclosed subject matter is now described with reference to the drawings, wherein like reference numerals are used to refer to like elements throughout. In the following description, for purposes of explanation, numerous specific details are set forth in order to provide a thorough understanding of the disclosed subject matter. It may be evident, however, that the disclosed subject matter may be practiced without these specific details. In other instances, well-known structures and devices are shown in block diagram form in order to facilitate describing the disclosed subject matter.

FIG. 1 illustrates a block diagram of an example computer system 100 that can facilitate a type-based message bus with message type hierarches for non-object oriented applications, in accordance with certain embodiments of this disclosure. Computer system 100 comprises type-aware message bus 102, type-aware message subscriber 104, type-aware message publisher 106, and string-aware message bus 108. In some examples, type-aware message bus 102, type-aware message subscriber 104, type-aware message publisher 106, and string-aware message bus 108 can be implemented using aspects of computer 1102 of FIG. 11.

In some examples, type-aware message bus 102 comprises a message bus that can maintain a list of subscribers to various event channels, and promulgate messages published to a particular event channel to subscribers of that event channel. Type-aware message subscriber 104 can be a computer component (such as a programming language object) that subscribes to a particular event channel of type-aware message bus 102 by invoking a subscription method that identifies both a class of messages (e.g., Animal in subscription message 204 of FIG. 2) and a callback method (e.g., callback1 in subscription message 204 of FIG. 2) that type-aware message bus 102 can invoke to publish messages to type-aware message subscriber 104. In some examples, this callback method can be a reference to the subscriber itself (e.g., "this" in some programming languages).

Figure 5:
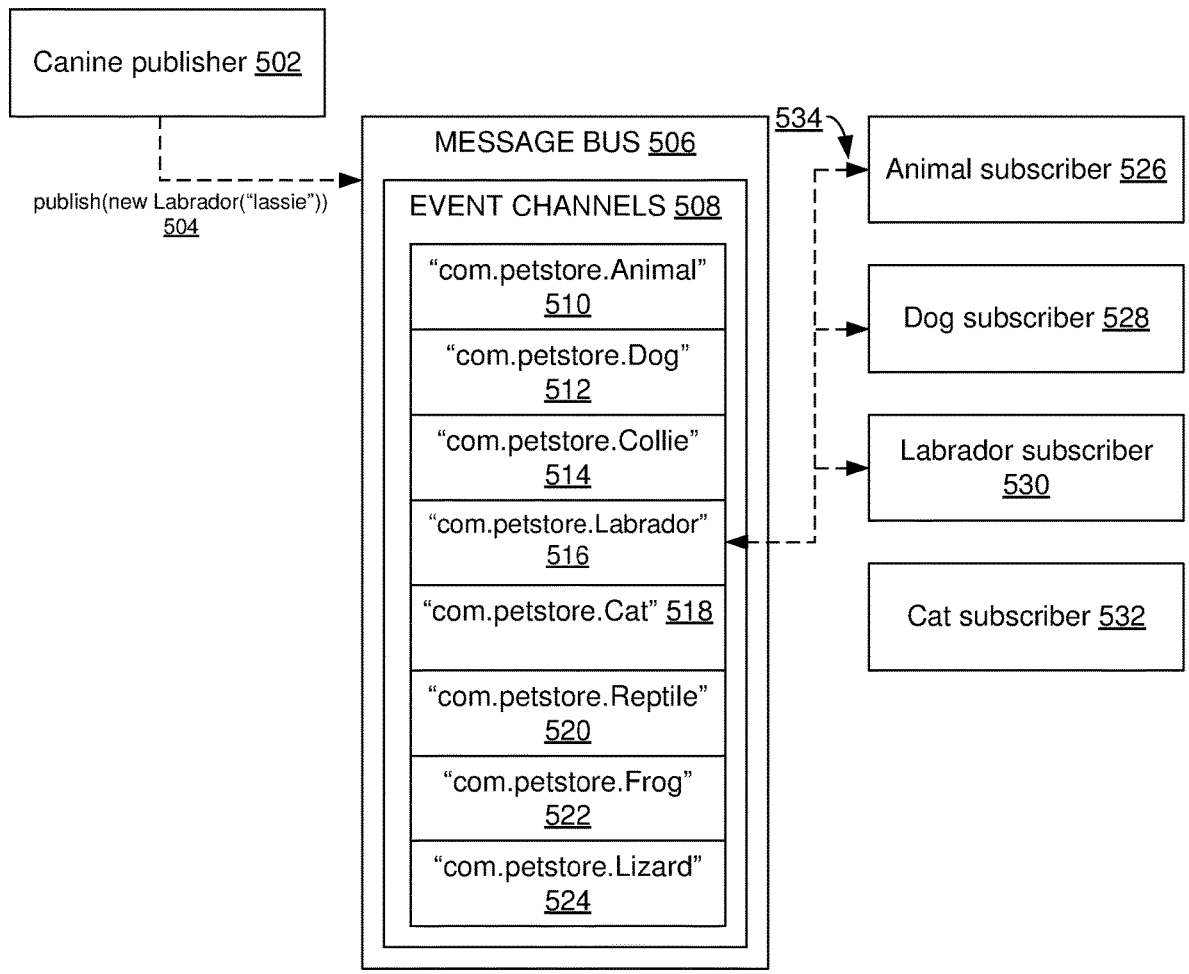
FIG. 5 illustrates an example publication mechanism for a type-based message bus with message type hierarchies for non-object oriented applications, in accordance with certain embodiments of this disclosure.

Type-aware message publisher 106 can be a computer component (such as a programming language object) that publishes a message to a particular event channel of type-aware message bus 102 by invoking a publication method that takes a particular computer programming object-oriented class type as an argument (e.g., "new Labrador ("lassie")" in publish message 504 of FIG. 5), where the object-oriented class type corresponds to the event channel being published to.

When type-aware message bus 102 receives a subscription message, type-aware message bus 102 can parse the subscription message to determine a class being identified, and determine an event channel that corresponds to that class. Type-aware message bus 102 can subscribe the subscriber to receive messages on this event channel. Type-aware message bus 102 can maintain an association between subscribers and event channels in a computer memory. Type-aware message bus 102 can also determine any event channels that correspond to a subclass of the class identified in the subscription message, and subscribe the subscriber to receive messages on these subclass event channels.

When type-aware message bus 102 receives a publication message, type-aware message bus 102 can parse the publication message to determine a class being identified, and determine an event channel that corresponds that class. Type-aware message bus 102 can publish the message to each subscriber to that event channel Since, during the subscription process, a subscriber is subscribed to the event channel that it is explicitly subscribing to, as well as that event channel's subclass event channels, type-aware message bus 102 can have each subscriber that subscribed to a superclass event channel of the present event channel already subscribed to the present event channel.

As depicted, type-aware message bus 102 is built on top of string-aware message bus 108, which can be a message bus that is configured to handle subscriptions and publications based on strings (rather than object types). In some examples, type-aware message bus 102 leverages string-aware message bus 108. That is, type-aware message bus 102 can receive type-based subscriptions from type-aware message subscriber 104 and type-based publications from type-aware message publisher 106, and convert these type-based communications into string-based communications that string-aware message bus 108 is configured to utilize. In some examples, type-aware message bus 102 can receive a message subscription from type-aware message subscriber 104, parse the subscription for subclass event channels to also be subscribed to, and notify string-aware message bus 108 to subscribe type-aware message subscriber 104 to these multiple event channels.

It can be appreciated that there are other examples where type-aware message bus 102 does not leverage string-aware message bus 108, but offers the functionality of string-aware message bus 108 itself.

An example of a message bus, such as message bus 102, can involve a library system. When a new book is added to the library, various components of a library's computer system can be informed of this event, e.g., a system that tracks stock of books, a website that identifies what books are available, and a system that handles checking out a book. A message bus can serve as a broker between these various systems of a library so that one system can communicate with the message bus, which will in turn communicate with the other systems (in contrast to an approach where the one system must communicate with each other system). This architecture can be utilized to decouple the various components of a system, such as a library system, which can simplify development and maintenance of the system.

In an example where a data center is monitored, a refresh message sent via a message bus can indicate that something happened to a computer of the data center. There can be a class hierarchy for messages that can include things like storage, and parts of a user interface that deal with storage and that receive a message to receive their data based on a storage event being communicated by the message bus. For example, a hierarchy can include that something has changed at a top level. Then, a subclass of this can be storage, which in turn can have subclasses such as new group, new storage pool, and disk added to system. Then, parts of a user interface directed to data protection or performance might not receive a storage event via the message bus, in this example.

Example Subscription and Publication Mechanisms

Figure 2:
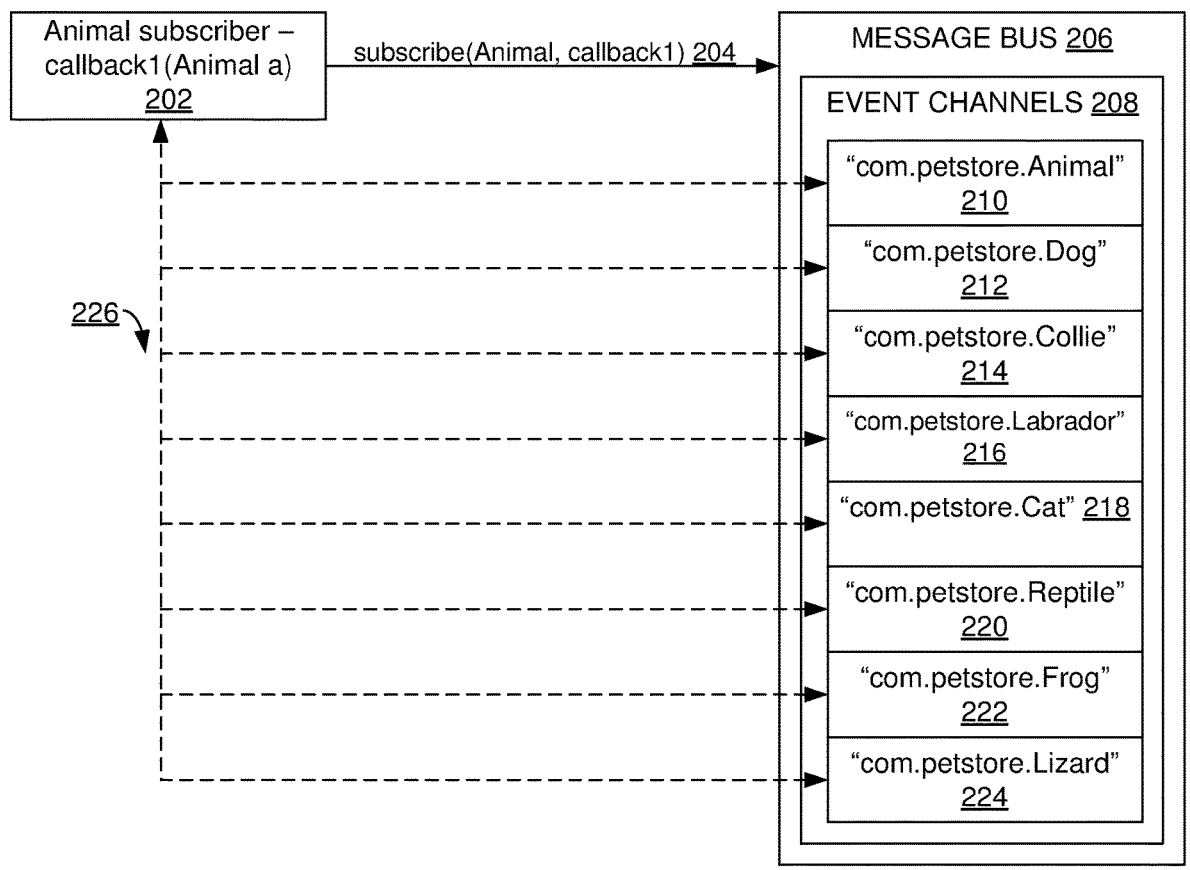
FIG. 2 illustrates an example subscription mechanism for a type-based message bus with message type hierarchies for non-object oriented applications, in accordance with certain embodiments of this disclosure.

FIG. 2 illustrates an example subscription mechanism 200 for a type-based message bus with message type hierarchies for non-object oriented applications, in accordance with certain embodiments of this disclosure. In some examples, aspects of subscription mechanism 200 can be implemented with aspects of computer system 100 of FIG. 1. For example, animal subscriber 202 can be implemented with aspects of type-aware message subscriber 104, and message bus 206 can be implemented with aspects of type-aware message bus 106.

Subscription mechanism 200 comprises animal subscriber 202, animal subscription message 204, and message bus 206. In turn, message bus 206 comprises event channels 208. Then, event channels 208 comprises animal channel 210, dog channel 212, collie channel 214, Labrador channel 216, cat channel 218, reptile channel 220, frog channel 222, and lizard channel 224.

The example of subscription mechanism 200 can illustrate how subscribing to an event channel can also result in subscribing to subclasses of that event channel. In the present example, animal subscriber 202 sends animal subscription message 204 to message bus 206. Animal subscription message 204 can comprise a callback method (e.g., "callback1" in subscribe(Animal, callback1)), which can be a method provided from animal subscriber 202 to message bus 206 that message bus 206 can invoke to send a message to animal subscriber 202.

In response to receiving animal subscription message 204, message bus 206 registers animal subscriber 202 to receive messages on animal channel 210. Then, message bus 206 examines event channels 208 for subclasses of animal channel 210 to register animal subscriber 202 to receive messages for.

In the course of examining the channels of event channels 208 for subclasses of animal channel 210 to register animal subscriber 202 to receive messages for, message bus 206 registers animal subscriber 202 to receive messages for dog channel 212, collie channel 214, Labrador channel 216, cat channel 218, reptile channel 220, frog channel 222, and lizard channel 224, since each of these channels is a subclass of animal channel 210. Then, in this example, when a publisher (e.g., type aware message publisher 106 of FIG. 1) publishes a message to any of these channels—animal channel 210, dog channel 212, collie channel 214, Labrador channel 216, cat channel 218, reptile channel 220, frog channel 222, and lizard channel 224—message bus 206 will send that message to animal subscriber 202 via a callback method provided in subscription message 204.

As part of registering a subscriber to receive messages from various event channels, message bus 206 can connect the callback method 226 of subscription message 204 ("callback1") between animal subscriber 202 and each event channel that animal subscriber 202 is registered to. Here, those event channels are animal channel 210, dog channel 212, collie channel 214, Labrador channel 216, cat channel 218, reptile channel 220, frog channel 222, and lizard channel 224.

Figure 3:
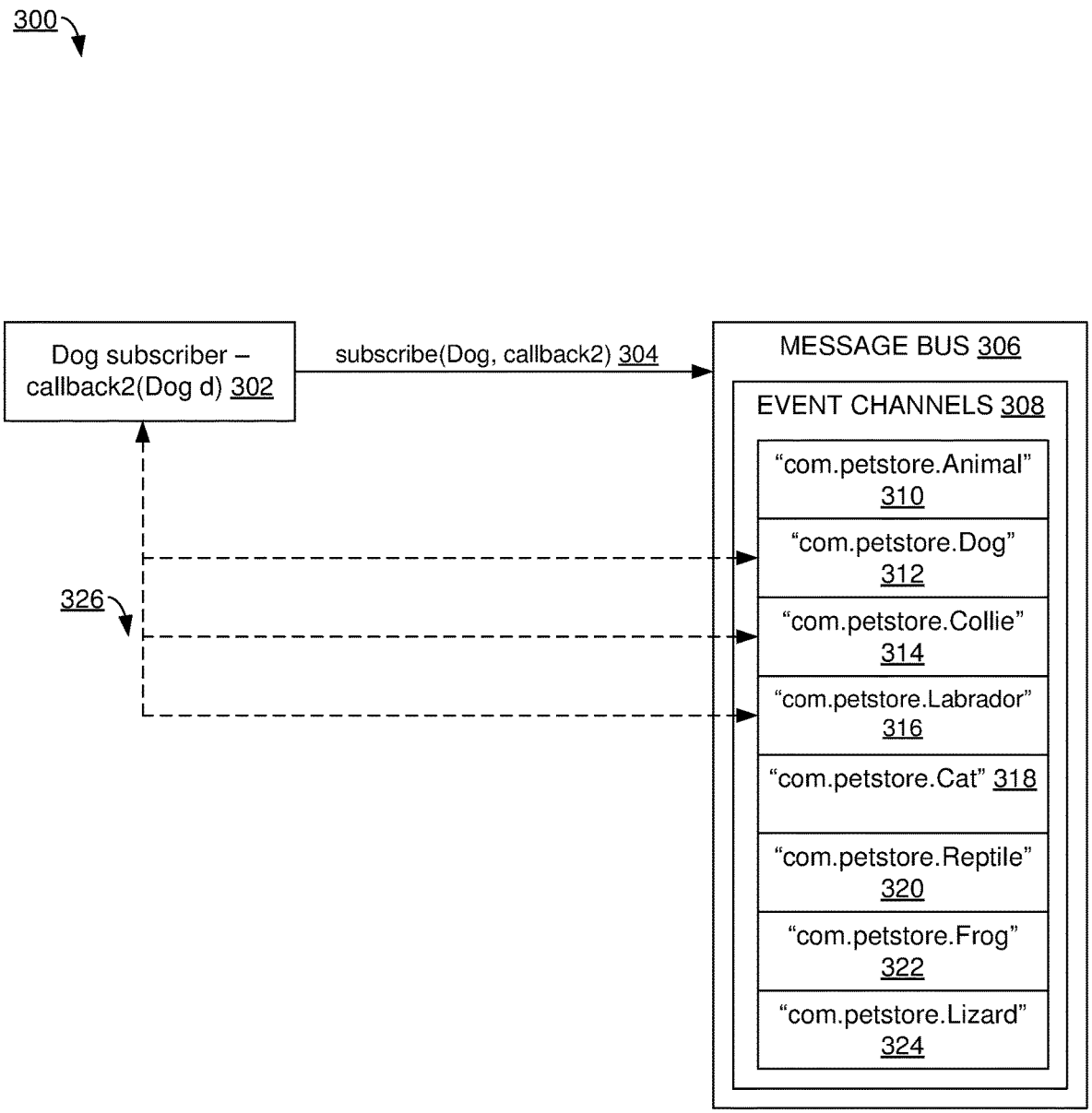
FIG. 3 illustrates a second example subscription mechanism for a type-based message bus with message type hierarchies for non-object oriented applications, in accordance with certain embodiments of this disclosure.

FIG. 3 illustrates a second example subscription mechanism 300 for a type-based message bus with message type hierarchies for non-object oriented applications, in accordance with certain embodiments of this disclosure. In some examples, aspects of subscription mechanism 300 can be implemented with aspects of computer system 100 of FIG. 1. For example, dog subscriber 302 can be implemented with aspects of type-aware message subscriber 104, and message bus 306 can be implemented with aspects of type-aware message bus 102.

Subscription mechanism 300 comprises dog subscriber 302, dog subscription message 304, and message bus 306. In turn, message bus 306 comprises event channels 308. Then, event channels 308 comprises animal channel 310, dog channel 312, collie channel 314, Labrador channel 316, cat channel 318, reptile channel 320, frog channel 322, and lizard channel 324.

In concert with the example of subscription mechanism 200 of FIG. 2, the example of subscription mechanism 300 can illustrate how subscribing to an event channel can also result in subscribing to subclasses of that event channel In the example of subscription mechanism 200 of FIG. 2, the subscriber subscribes to an event channel (animal channel 210) for which all other channels in the example are subclasses of that event channel So, the subscriber is registered to receive messages on all event channels of event channels 208.

In contrast, in the example subscription mechanism 300 of FIG. 3, dog subscriber 302 subscribes to an event channel (dog channel 312) for which some—but not all—of the other event channels are subclasses. So, by subscribing to dog channel 312, dog subscriber 302 will registered to receive messages published to some—but not all—of the other event channels of event channels 308.

In the present example, dog subscriber 302 sends dog subscription message 304 to message bus 306. Dog subscription message 304 can comprise a callback method (e.g., "callback2" in subscribe(Dog, callback2)), which can be a method provided from dog subscriber 302 to message bus 306 that message bus 306 can invoke to send a message to dog subscriber 302.

In response to receiving dog subscription message 304, message bus 306 registers dog subscriber 302 to receive messages on dog channel 312. Then, message bus 306 examines event channels 308 for subclasses of dog channel 312 to register dog subscriber 302 to receive messages for. As depicted, message bus 306 determines that collie channel 314 and Labrador channel 316 are subclasses of dog channel 312, and registers dog subscriber 302 to receive messages published to these channels. Likewise, message bus 306 determines that animal channel 310, cat channel 318, reptile channel 320, frog channel 322, and lizard channel 324 are not subclasses of dog channel 312, so does not register dog subscriber 302 to receive messages that are published to these channels.

As part of registering a subscriber to receive messages from various event channels, message bus 306 can connect the callback method 326 of subscription message 304 ("callback2") between dog subscriber 302 and each event channel that dog subscriber 302 is registered to. Here, those event channels are dog channel 312, collie channel 314, and Labrador channel 316.

Figure 4:
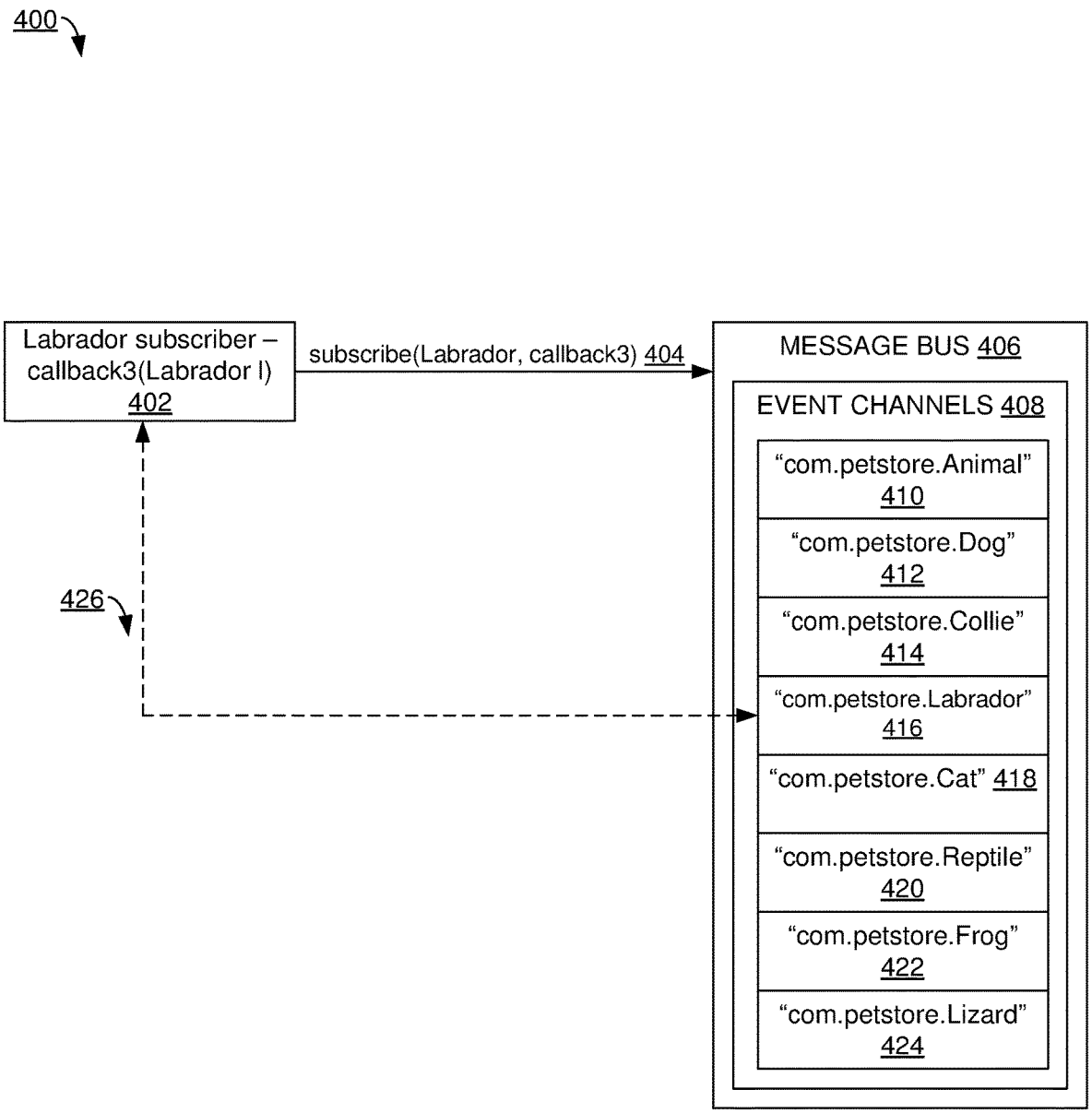
FIG. 4 illustrates a third example subscription mechanism for a type-based message bus with message type hierarchies for non-object oriented applications, in accordance with certain embodiments of this disclosure.

FIG. 4 illustrates a third example subscription mechanism 400 for a type-based message bus with message type hierarches for non-object oriented applications, in accordance with certain embodiments of this disclosure. In some examples, aspects of subscription mechanism 400 can be implemented with aspects of computer system 100 of FIG. 1. For example, Labrador subscriber 402 can be implemented with aspects of type-aware message subscriber 104, and message bus 406 can be implemented with aspects of type-aware message bus 102.

In general, subscription mechanism 200 of FIG. 2 and subscription mechanism 300 of FIG. 3 illustrate subscription mechanisms where subscribing to a particular event channel also results in being subscribed to event channels that are subclasses of that particular event channel In contrast, the example of subscription mechanism 400 illustrates an example where a subscription is made to an event channel that has no subclass event channels, so just the one event channel is subscribed to.

Subscription mechanism 400 comprises Labrador subscriber 402, Labrador subscription message 404, and message bus 406. In turn, message bus 406 comprises event channels 408. Then, event channels 408 comprises animal channel 410, dog channel 412, collie channel 414, Labrador channel 416, cat channel 418, reptile channel 420, frog channel 422, and lizard channel 424.

In the present example, Labrador subscriber 402 sends Labrador subscription message 404 to message bus 406. Labrador subscription message 404 can comprise a callback method (e.g., "callback3" in subscribe(Labrador, callback3)), which can be a method provided from Labrador subscriber 402 to message bus 406 that message bus 406 can invoke to send a message to Labrador subscriber 402.

In response to receiving Labrador subscription message 404, message bus 406 registers Labrador subscriber 402 to receive messages on Labrador channel 416. Then, message bus 406 examines event channels 408 for subclasses of Labrador channel 416 to register Labrador subscriber 402 to receive messages for. As depicted, message bus 406 determines that none of the other event channels—animal channel 410, dog channel 412, collie channel 414, cat channel 418, reptile channel 420, frog channel 422, and lizard channel 424—are subclass event channels of Labrador channel 416. So, in this example, message bus 406 does not register Labrador subscriber 402 to receive messages for other event channels aside from Labrador channel 416, as a result of receiving Labrador subscription message 404.

As part of registering a subscriber to receive messages from various event channels, message bus 406 can connect the callback method 426 of subscription message 404 ("callback3") between Labrador subscriber 402 and each event channel that Labrador subscriber 402 is registered to. Here, that event channel is just Labrador channel 416.

FIG. 5 illustrates an example publication mechanism 500 for a type-based message bus with message type hierarches for non-object oriented applications, in accordance with certain embodiments of this disclosure.

Publication mechanism 500 comprises canine publisher 502, Labrador publication message Labrador pub message 504, message bus 506, animal subscriber 526, dog subscriber 528, Labrador subscriber 530, and cat subscriber 532. In turn, message bus 506 comprises event channels 508. Then, event channels 508 comprises animal channel 510, dog channel 512, collie channel 514, Labrador channel 516, cat channel 518, reptile channel 520, frog channel 522, and lizard channel 524.

In some examples, animal subscriber 526 can be animal subscriber 202 of FIG. 2; dog subscriber 528 can be dog subscriber 302 of FIG. 3; and Labrador subscriber 530 can be Labrador subscriber 402 of FIG. 4. Cat subscriber 532 can be a subscriber similar to Labrador subscriber 530, but a subscriber that subscribes to messages on cat channel 518 (as opposed to Labrador channel 516).

As depicted, Canine publisher 502 is a computer component that publishes a message to one or more event channels of event channels 508. Canine publisher 502 sends publish message 504 (publish(new Labrador("lassie"))) to message bus 506. Message bus 506 receives publish message, and determines which event channels (if any) of event channels 508 to publish the message to. Message bus 506 can publish a message to a subscriber by utilizing the callback method provided by that subscriber (e.g., callback1 of subscription message 204 of FIG. 2).

In the example of FIG. 5, message bus 506 will publish an event to the channel identified by the event, which will include publishing the event to any subscriber that subscribed to a superclass event channel of that channel In the same way that a subscriber to animal channel 510 will also be subscribed to dog channel 512 and Labrador channel 516 (and collie channel 514, cat channel 518, etc.), and a subscriber to dog channel 512 will also be subscribed to collie channel 514 and Labrador channel 516 (i.e., the channel's subclass event channel(s)), publishing a message will result in publishing that message to subscribers of the identified event channel, which includes subscribers to any of that identified event channel's superclass event channels.

So, when message bus 506 receives publish message 504, message bus 506 determines that the message is to be published to Labrador channel 516, and publishes 534 the event to Labrador subscriber 530. Dog subscriber 528 subscribed to dog channel 512, which also resulted in it being subscribed to subclass Labrador channel 516, so message bus 506 publishes 534 the event to dog subscriber 528. Similarly, animal subscriber 526 subscribed to animal channel 510, which also resulted in it being subscribed to child subclass dog channel 512, and grandchild subclass Labrador channel 516 (among other subclass event channels), so message bus 506 publishes 534 the event to animal subscriber 526. The callback method that is connected between a subscriber and an event channel (e.g., as described regarding connect the callback method 226 of FIG. 2) can be utilized to publish these events to the subscribers.

In this example, message bus 506 did not register cat subscriber 532 to receive messages on Labrador channel 516, because Labrador channel 516 is not a subclass event channel of cat event channel 518 (to which cat subscriber 532 did subscribe). So, message bus 506 does not publish this event to cat subscriber 532.

Figure 6:
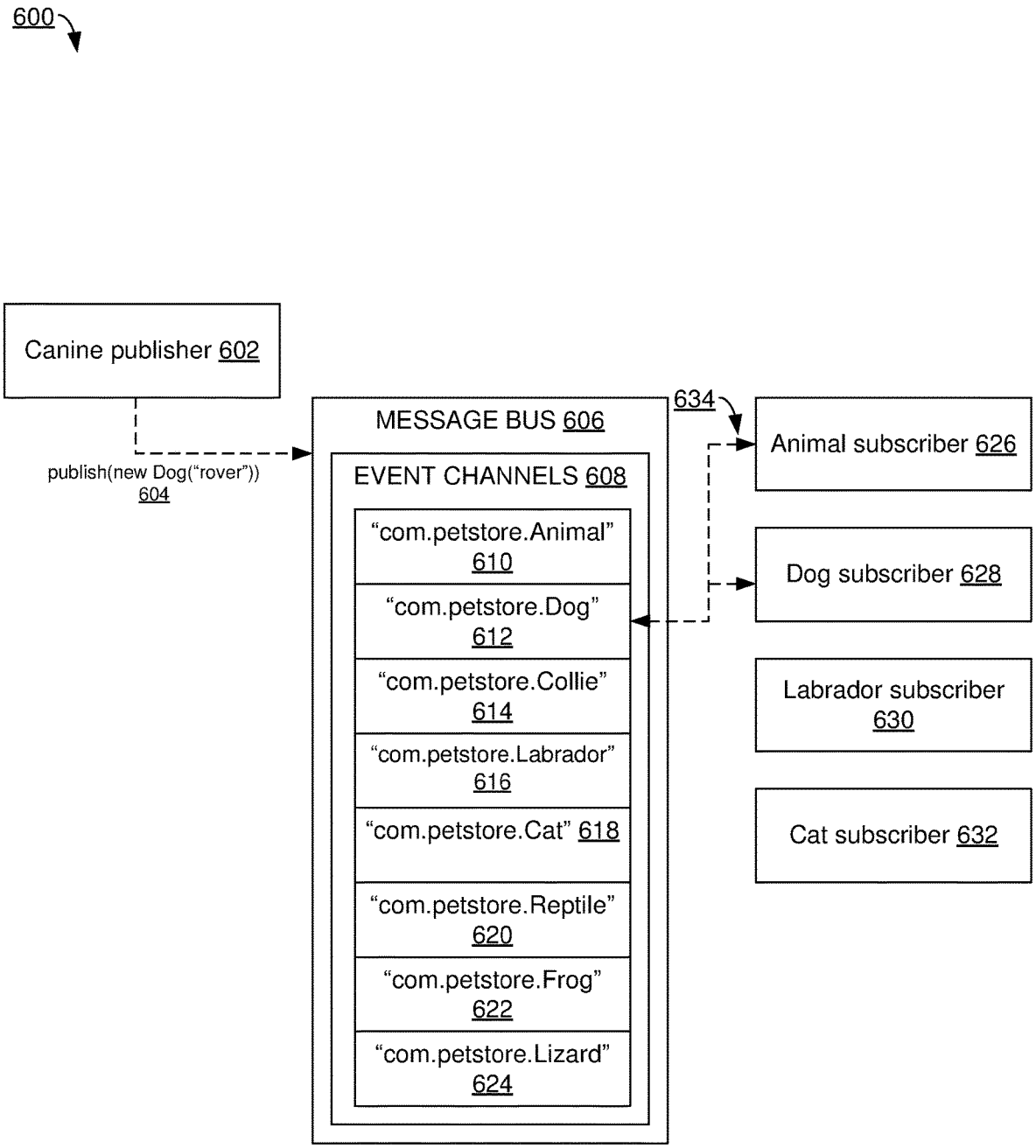
FIG. 6 illustrates a second example publication mechanism for a type-based message bus with message type hierarchies for non-object oriented applications, in accordance with certain embodiments of this disclosure.

FIG. 6 illustrates a second example publication mechanism 600 for a type-based message bus with message type hierarches for non-object oriented applications, in accordance with certain embodiments of this disclosure.

Publication mechanism 500 of FIG. 5 generally depicts a situation where an event was published to a subscriber that directly subscribed to that event channel, as well as subscribers that directly subscribed to a superclass event channel of that event channel. Then, publication mechanism 500 also generally depicts an event channel that is not a superclass of that event channel not receiving the message. Publication mechanism 600 generally adds to this example of publication mechanism 500 by illustrating that an event is not published to subscriber that subscribed to a subclass event channel of the event channel being published to.

Publication mechanism 600 comprises canine publisher 602, Labrador publication message Labrador pub message 604, message bus 606, animal subscriber 626, dog subscriber 628, Labrador subscriber 630, and cat subscriber 632. In turn, message bus 606 comprises event channels 608. Then, event channels 608 comprises animal channel 610, dog channel 612, collie channel 614, Labrador channel 616, cat channel 618, reptile channel 620, frog channel 622, and lizard channel 624.

In some examples, animal subscriber 626 can be animal subscriber 202 of FIG. 2; dog subscriber 628 can be dog subscriber 302 of FIG. 3; and Labrador subscriber 630 can be Labrador subscriber 402 of FIG. 4. Cat subscriber 332 can be a subscriber similar to Labrador subscriber 630, but a subscriber that subscribes to messages on cat channel 618 (as opposed to Labrador channel 616).

As depicted, Canine publisher 602 is a computer component that publishes a message to one or more event channels of event channels 608. Canine publisher 602 sends publish message 604 (publish(new Dog("rover"))) to message bus 606. Message bus 606 receives publish message, and determines which event channels (if any) of event channels 608 to publish the message to. Message bus 606 can publish a message to a subscriber by utilizing the callback method provided by that subscriber (e.g., callback1 of subscription message 204 of FIG. 2) that is connected 634 between the subscriber and one or more event channels.

In the example of FIG. 6, message bus 606 will publish an event to the channel identified by the event, which will include publishing the event to any subscriber that subscribed to a superclass event channel of that channel In the same way that a subscriber to animal channel 610 will also be subscribed to dog channel 612 (and collie channel 614, Labrador channel 616, cat channel 618, etc.), publishing a message will result in publishing that message to subscribers of the identified event channel, which includes subscribers to any of that identified event channel's superclass event channels.

So, when message bus 606 receives publish message 604, message bus 606 determines that the message is to be published to dog channel 614, and publishes the event to dog subscriber 628. Animal subscriber 626 subscribed to animal channel 610, which also resulted in it being subscribed to child subclass dog channel 612, so message bus 606 publishes the event to animal subscriber 626.

In this example, message bus 606 did not register either Labrador subscriber 630 nor cat subscriber 632 to receive messages on dog channel 614. Message bus 606 did not subscribe Labrador subscriber 630 to receive messages published to dog channel 614 because Labrador subscriber 630 subscribed to Labrador channel 616, which is not a superclass channel of dog channel 614. Rather, Labrador channel 616 is a subclass channel of dog channel 614. So, message bus 606 does not publish this event to Labrador subscriber 630.

Then, message bus 606 did not subscribe cat subscriber 634 to receive messages published to dog channel 616, because dog channel 616 is not a subclass event channel of cat event channel 618 (to which cat subscriber 632 did subscribe). So, message bus 606 does not publish this event to cat subscriber 632.

Example Process Flows

Figure 7:
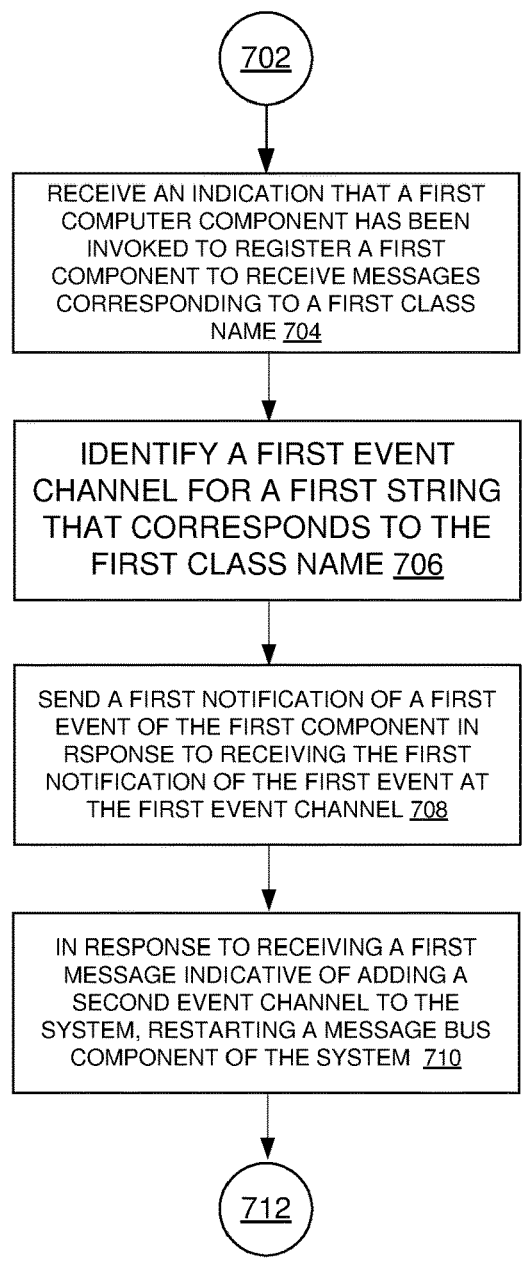
FIG. 7 illustrates an example process flow for providing a type-based message bus with message type hierarchies for non-object oriented languages, in accordance with certain embodiments of this disclosure.

FIG. 7 illustrates an example process flow 700 for providing a type-based message bus with message type hierarchies for non-object oriented languages, in accordance with certain embodiments of this disclosure.

It can be appreciated that process flow 700 is an example process flow, and that there can be embodiments that implement more or fewer operations than are depicted in process flow 700, or that implement the operations of process flow 700 in a different order than is depicted in process flow 700.

In some embodiments, aspects of process flow 700 can be implemented with type-aware message bus 102 of FIG. 1, message bus 206 of FIG. 2, message bus 306 of FIG. 3, message bus 406 of FIG. 4, message bus 506 of FIG. 5, and/or message bus 606 of FIG. 6. Process flow 700 begins with 702, and then moves to operation 704.

Operation 704 depicts receiving an indication that a first computer component has been invoked to register a first component to receive messages corresponding to a first class name, the first class name comprising an object oriented format. For example, type-aware message bus 102 can receive a subscription message from type-aware message subscriber 104 to subscribe to an event channel that corresponds to the first class name.

In some examples, operation 704 comprises receiving an indication of registering a first component to receive messages corresponding to a first class name, the first class name comprising an object oriented format. In some examples, operation 704 comprises registering a first component to receive messages corresponding to a first class name, the first class name comprising an object oriented format.

In some examples, the first computer component comprises a first callback computer component that is invoked in the sending the first notification of the first event to the first component. This callback computer component can be "callback1" in subscription message 204 (subscribe(Animal, callback1)).

In some examples, operation 704 comprises determining that the first callback computer component accepts a first parameter that corresponds to the first event channel being subscribed to. That is, type-checking can be performed on subscription, where a message bus can check that the subscription matches the class. In some examples, operation 704 comprises determining that the first callback computer component accepts a first parameter that corresponds to a first superclass of the first class name. Here, type-checking can also be performed on subscription, and for a superclass of the identified class.

In some examples, operation 704 comprises creating a first event listener that corresponds to the first event channel for a first fully-qualified name of the first class name, and creating a second event listener that corresponds to a second event channel for a second class name, wherein the second class name comprises a child class of the first class name. That, is an angularJS-type listener can be created for a fully-qualified name of a class, and then for its child classes.

In some examples, operation 704 comprises recursively examining a set of at least one subclasses of the first class name that comprises the second class name. That is, subclasses for a class that is being subscribed to can be recursively identified. For example, where the subscriber subscribes to animal, an approach to identify subclasses for animal can be performed that identifies dog and cat. Then, this approach can again be performed recursively on dog (to identify collie and Labrador as subclasses) and on cat (which identifies no subclasses, in this example). This approach can again be performed recursively on collie (which identifies no subclasses, in this example) and Labrador (which identifies no subclasses, in this example).

After operation 704, process flow 700 moves to operation 706.

Operation 706 depicts identifying a first event channel for a first string that corresponds to the first class name That is, when a subscriber sends a subscription message to a message bus, the message bus can determine an event channel that the subscription message identifies via a first class name identified in the subscription message.

In some examples, the first event channel is part of a message bus that is configured to permit subscribing and publishing to a plurality of event channels that includes the first event channel using a plurality of strings that includes the first string. That is, while the subscription message can identify a class to subscribe to an event channel, the underlying message bus can be string based rather than object oriented, and a conversion between classes and strings can be performed.

After operation 706, process flow 700 moves to operation 708.

Operation 708 depicts sending a first notification of a first event to the first component in response to receiving the first notification of the first event at the first event channel. When a publisher publishes a message to a particular event channel, the message bus can determine one or more subscribers to that event channel, and publish the message to those subscribers.

In some examples, the first notification of the first event comprises a first object of a first class that matches the first class name. That is, in addition to subscription to a message bus being object oriented, publishing to a message bus can also be object oriented.

In some examples, operation 708 comprises sending a second notification of the first event to a second component, the second component having subscribed to a superclass event channel of the first event channel. In some examples, operation 708 comprises sending the first event to a second component that subscribes to a second event channel, the second event channel corresponding to a first object oriented superclass of the first object oriented class.

That is, in addition to publishing a message directed to a particular event channel to subscribers that subscribed to that particular event channel, the message can also be published to subscribers that originally subscribed to a superclass event channel of the particular event channel.

In some examples, operation 708 comprises sending the first notification of the first event to a third component that subscribes to a third event channel, the third event channel corresponding to a first object oriented superclass of the first object oriented class. That is, a particular event channel can have multiple superclass event channels (e.g., Labrador channel 202 of FIG. 2 has both dog channel 212 and animal channel 210 as superclass event channels), and in some examples, a message published to an event channel can be published to subscribers of all of these superclass event channels.

After operation 708, process flow 700 moves to operation 710.

Operation 710 depicts, in response to receiving, by the system, a first message indicative of adding a second event channel to the system, restarting a message bus component of the system. That is, a message bus can be restarted when adding a new event channel.

In some examples, operation 710 comprises, performing the identifying the first event channel for the first string that corresponds to the first class name again. That is, upon restart, a message bus can redo its subscriptions, including registering a particular subscriber for subclass event channels of the event channel that the subscriber has subscribed to.

In some examples, operation 710 comprises recompiling and restarting a component that performs the registering in response to adding a second class name not currently recognized as valid. That is, the message bus can be both recompiled and restarted when a new event channel is added.

In some examples, operation 710 comprises redoing at least one assignment between a group of at least one component that includes the first component and a group of at least one event channels that includes the first event channel. That is, assignments for subscriptions can be redone while recompiling the message bus.

In some examples, operation 710 comprises performing type checking on whether a second class name for the first event matches the first class name while performing the recompiling. In some examples, operation 710 comprises halting the recompiling in response to identifying a type-checking error while performing the type checking. That is, an error can be thrown at compile-time where there is a class-type mismatch between a subscriber and an event channel.

In some examples, performing type checking comprises determining that the first component has provided a computer component that is able to accept an argument that corresponds to the first event channel. That is, type checking at compile time can be performed on an argument for a callback method, and compared to the event channel. After operation 710, process flow 70 moves to 712, where process flow 700 ends.

Figure 8:
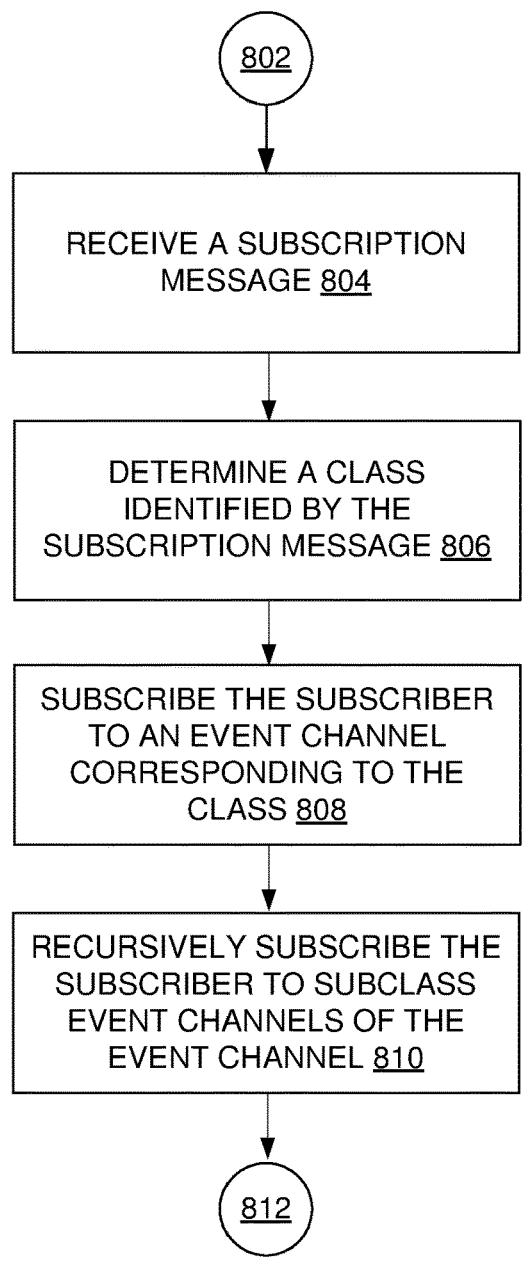
FIG. 8 illustrates an example process flow for subscribing to messages with a type-based message bus with message type hierarchies for non-object oriented applications, in accordance with certain embodiments of this disclosure.

FIG. 8 illustrates an example process flow 800 for subscribing to messages with a type-based message bus with message type hierarchies for non-object oriented applications, in accordance with certain embodiments of this disclosure.

It can be appreciated that process flow 800 is an example process flow, and that there can be embodiments that implement more or fewer operations than are depicted in process flow 800, or that implement the operations of process flow 800 in a different order than is depicted in process flow 800.

In some embodiments, aspects of process flow 800 can be implemented with type-aware message bus 102 of FIG. 1, message bus 206 of FIG. 2, message bus 306 of FIG. 3, message bus 406 of FIG. 4, message bus 506 of FIG. 5, and/or message bus 606 of FIG. 6. Process flow 800 begins with 802, and then moves to operation 804.

Operation 804 depicts receiving a subscription message. In some examples, this subscription message can be subscription message 204 from animal subscriber 202 of FIG. 2, subscription message 304 from dog subscriber 302 of FIG. 3, or subscription message 404 from Labrador subscriber 402 of FIG. 4. After operation 804, process flow 800 moves to operation 806.

Operation 806 depicts determining a class identified by the subscription message. In some examples, the subscription message can contain one or more arguments or parameters, and one of these arguments or parameters that can be found in a known location of the subscription message can identify the class. For example, a message bus can parse subscription message 204 of FIG. 2, which reads "subscribe (Animal, callback1)," to determine that the class identified by the subscription message is "Animal."

Similarly, a message bus can parse subscription message 304 of FIG. 3, which reads "subscribe(Dog, callback2)," to determine that the class identified by the subscription message is "Dog." And, a message bus can parse subscription message 404 of FIG. 4, which reads "subscribe(Labrador, callback3)," to determine that the class identified by the subscription message is "Labrador." After operation 806, process flow 800 moves to operation 808.

Operation 808 depicts subscribing the subscriber to an event channel corresponding to the class. In some examples, a message bus can perform a translation from a class used by a message subscriber to identify an event channel to a string used by the message bus to identify an event channel. The message bus can use this string to identify a corresponding event channel (e.g., animal channel 210 of FIG. 2 can correspond to the class "Animal" identified in a subscription message). Once the corresponding event channel is identified, the message bus can subscribe the subscriber to the event channel, which can include connecting a callback method provided by the subscriber (e.g., "callback1" in subscription message 204 of FIG. 2), to the event channel. After operation 808, process flow 800 moves to operation 810.

Operation 810 depicts recursively subscribing the subscriber to subclass event channels of the event channel. The message bus can identify subclass event channels for the event channel (e.g., dog channel 212, cat channel 218, and reptile channel 220 can be subclass event channels of animal channel 210). The message bus can subscribe the subscriber to these subclass event channels. Then, the message bus can recursively perform this operation again on these subclass event channels to determine if they have any subclass event channels (e.g., grandchildren of the original class). The message bus can determine that dog channel 212 has subclass event channels of collie channel 214 and Labrador channel 216. The message bus can determine that cat channel 218 has no subclass event channels. The message bus can determine that reptile channel 220 has subclass event channels of frog channel 222 and Lizard channel 224.

Then, the message bus can recursively perform this operation for these subclass event channels that it identified in the last recursive operation and determine that collie channel 214, Labrador channel 216, frog channel 222, and lizard channel 224 have no subclass channels themselves. So, the recursion can end at this level. After operation 810, process flow 800 moves to 812, where process flow 800 ends.

Figure 9:
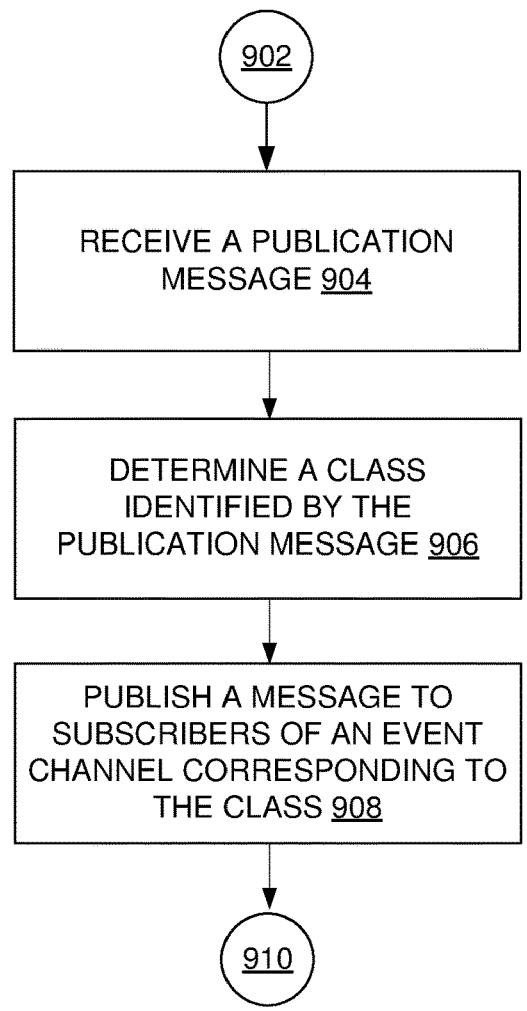
FIG. 9 illustrates an example process flow for publishing messages with a type-based message bus with message type hierarchies for non-object oriented applications, in accordance with certain embodiments of this disclosure.

FIG. 9 illustrates an example process flow 900 for publishing messages with a type-based message bus with message type hierarchies for non-object oriented applications, in accordance with certain embodiments of this disclosure.

It can be appreciated that process flow 900 is an example process flow, and that there can be embodiments that implement more or fewer operations than are depicted in process flow 900, or that implement the operations of process flow 900 in a different order than is depicted in process flow 900.

In some embodiments, aspects of process flow 900 can be implemented with type-aware message bus 102 of FIG. 1, message bus 206 of FIG. 2, message bus 306 of FIG. 3, message bus 406 of FIG. 4, message bus 506 of FIG. 5, and/or message bus 606 of FIG. 6. Process flow 900 begins with 902, and then moves to operation 904.

Operation 904 depicts receiving a publication message. This publication message can comprise publish message 504 of FIG. 5 sent by canine publisher 502, or publish message 604 of FIG. 6 sent by canine publisher 602. After operation 904, process flow 900 moves to operation 906.

Operation 906 depicts determining a class identified by the publication message. In some examples, operation 906 can be performed in a similar manner as operation 804 (which concerns subscription messages). After operation 906, process flow 900 moves to operation 908.

Operation 908 depicts publishing a message to subscribers of an event channel corresponding to the class. This can comprise sending the message using the callback method of the subscriber that has been connected to the event channel, for each subscriber to the event channel. After operation 908, process flow 900 moves to 910, where process flow 900 ends.

Figure 10:
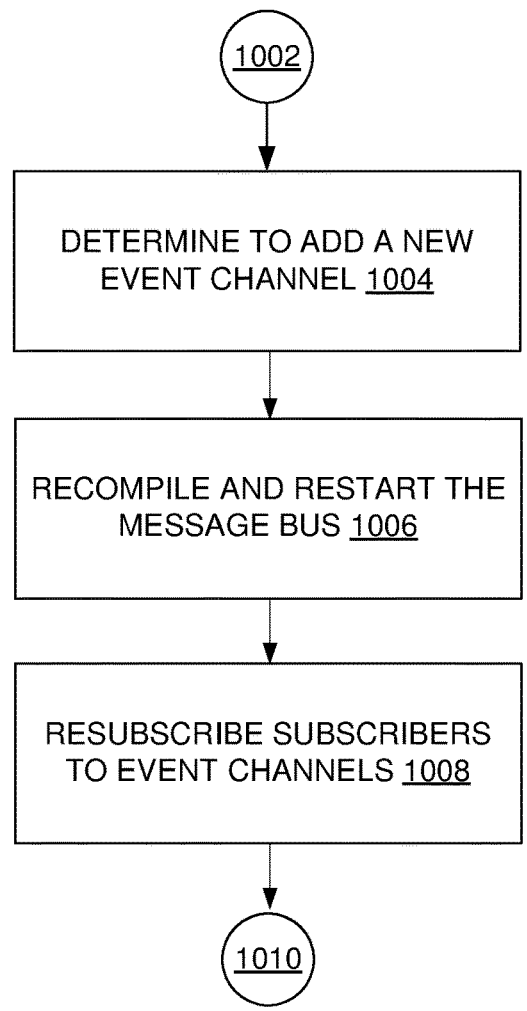
FIG. 10 illustrates an example process flow for adding new event channels for type-based message bus with message type hierarchies for non-object oriented applications, in accordance with certain embodiments of this disclosure.

FIG. 10 illustrates an example process flow 1000 for adding new event channels for type-based message bus with message type hierarchies for non-object oriented applications, in accordance with certain embodiments of this disclosure.

It can be appreciated that process flow 1000 is an example process flow, and that there can be embodiments that implement more or fewer operations than are depicted in process flow 1000, or that implement the operations of process flow 1000 in a different order than is depicted in process flow 1000.

In some embodiments, aspects of process flow 1000 can be implemented with type-aware message bus 102 of FIG. 1, message bus 206 of FIG. 2, message bus 306 of FIG. 3, message bus 406 of FIG. 4, message bus 506 of FIG. 5, and/or message bus 606 of FIG. 6. Process flow 1000 begins with 1002, and then moves to operation 1004.

Operation 1004 depicts determining to add a new event channel In some examples, a new event channel can be added via programming language code of a message bus by a developer of the message bus. In other examples, a new event channel can be added by invoking a predetermined application programming interface (API) of the message bus that is configured for adding new event channels. Adding a new event channel to a message bus can comprise adding a new class to a programming language code that is compiled to create the message bus. After operation 1004, process flow 1000 moves to operation 1006.

Operation 1006 depicts recompiling and restarting the message bus. In some examples, programming language code for the message bus can be recompiled to produce a computer component that is executable by a computer, and then this computer component is executed. After operation 1006, process flow 1000 moves to operation 1008.

Operation 1008 depicts re-subscribing subscribers to event channels. In some examples, subscriptions to event channels are maintained by an actively executing message bus. Where the message bus is restarted, the subscriptions are performed again. A message bus can maintain a non-volatile data store of event channels subscribed to, along with corresponding callback methods. In other examples, subscribers can resend subscription messages in response to a message bus restarting.

In some examples, re-subscribing subscribers to event channels can be performed in a similar manner as subscribing subscribers to event channels. This can include recursively subscribing the subscriber to subclass event channels of the event channel, similar to as described with respect to operation 810 of FIG. 8. After operation 1008, process flow 1000 moves to 1010, where process flow 1000 ends.

Example Operating Environment

Figure 11:
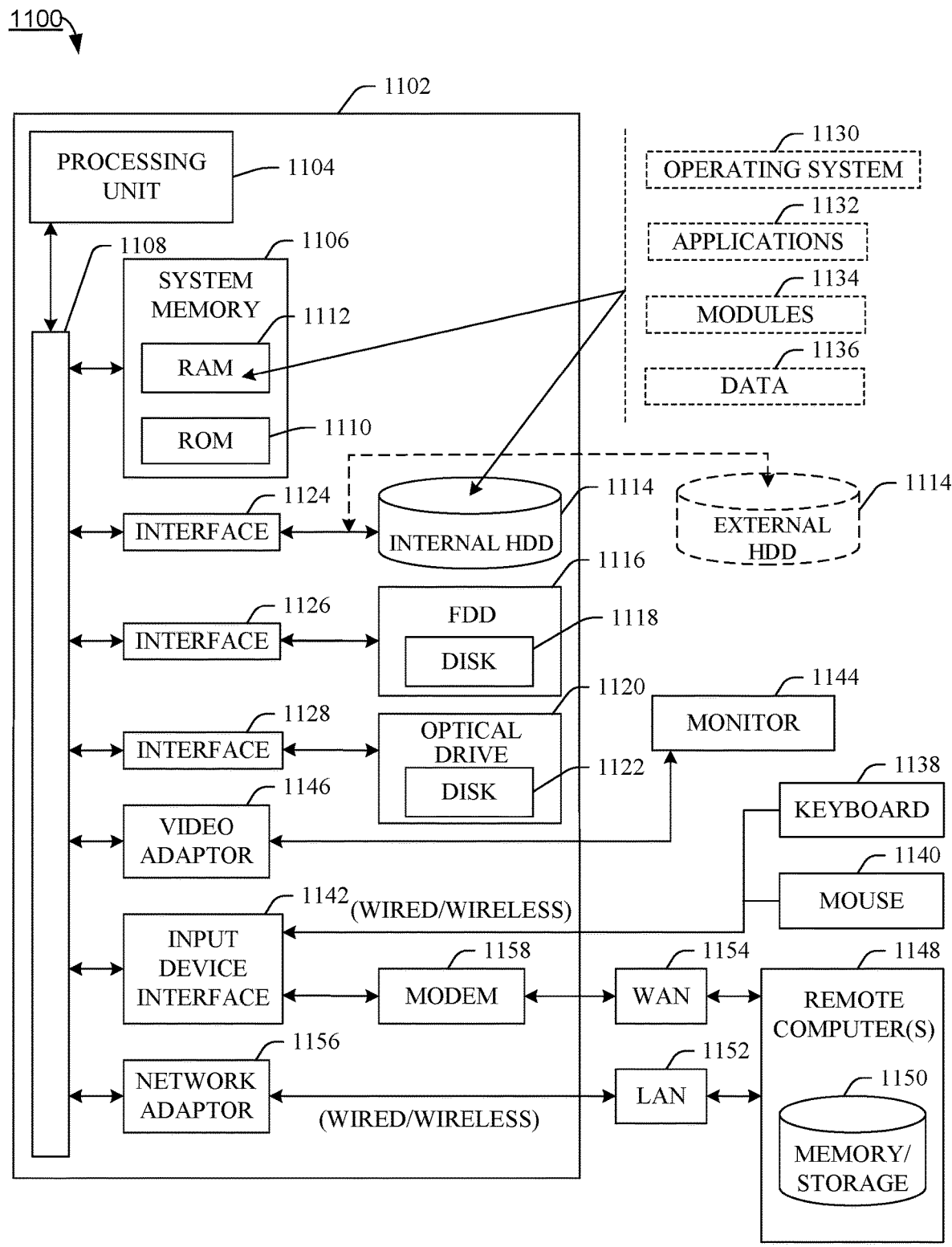
FIG. 11 illustrates an example block diagram of a computer operable to execute certain embodiments of this disclosure.

To provide further context for various aspects of the subject specification, FIG. 11 illustrates a block diagram of a computer 1102 operable to execute the disclosed storage architecture in accordance with aspects described herein. For example, aspects of computer 1102 can be used to implement type-aware message bus 102, type-aware message subscriber 104, type-aware message publisher 106, and string-aware message bus 108 of FIG. 1. In some examples, computer 1102 can implement aspects of the operating procedures of FIGS. 7-10 to provide for a type-based message bus with message type hierarches for non-object oriented applications.

FIG. 11 illustrates a block diagram of a computer 1102 operable to execute the disclosed communication architecture. To provide additional context for various aspects of the disclosed subject matter, FIG. 11 and the following discussion are intended to provide a brief, general description of a suitable computing environment 1100 in which the various aspects of the specification can be implemented. While the specification has been described above in the general context of computer-executable instructions that can run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices. The illustrated aspects of the specification can also be practiced in distributed computing environments where certain tasks are performed by remote processing devices that are linked through a communications network. In a distributed computing environment, program modules can be located in both local and remote memory storage devices.

Computing devices can include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, random access memory (RAM), read-only memory (ROM), electrically erasable programmable read-only memory (EEPROM), flash memory or other memory technology, compact disc read only memory (CD-ROM), digital versatile disc (DVD; sometimes referred to as digital video disc) or other optical disc storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals can refer to a signal that has one or more of its characteristics set or changed in such a manner as to encode information in one or more signals. By way of example, and not limitation, communication media include wired media, such as a wired network or direct-wired connection, and wireless media such as acoustic, radio frequency (RF), infrared and other wireless media.

With reference again to FIG. 11, the example environment 1100 for implementing various aspects of the specification includes a computer 1102, the computer 1102 including a processing unit 1104, a system memory 1106 and a system bus 1108. As an example, the component(s), server(s), node(s), cluster(s), system(s), and/or device(s) disclosed herein can each include at least a portion of the computer 1102. The system bus 1108 can couple system components including, but not limited to, the system memory 1106 to the processing unit 1104. The processing unit 1104 can be any of various commercially-available or custom processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 can include ROM 1110 and RAM 1112. A basic input/output system (BIOS) can be stored in a non-volatile memory 1110 such as ROM, erasable programmable read-only memory (EPROM), EEPROM, where the BIOS can contain the basic routines that help to transfer information between elements within the computer 1102, such as during startup. The RAM 1112 can also include a high-speed RAM such as static RAM for caching data, or NVRAM.

The computer 1102 further includes an internal hard disk drive (HDD) 1114, which internal hard disk drive 1114 can also be configured for external use in a suitable chassis (not shown), a magnetic floppy disk drive (FDD) 1116, (e.g., to read from or write to a removable diskette 1118) and an optical disc drive 1120, (e.g., reading a CD-ROM disc 1122 or, to read from or write to other high capacity optical media such as the DVD). The hard disk drive 1114, magnetic disk drive 1116 and optical disc drive 1120 can be connected to the system bus 1108 by a hard disk drive interface 1124, a magnetic disk drive interface 1126 and an optical drive interface 1128, respectively. The interface 1124 for external drive implementations can include at least one or both of Universal Serial Bus (USB) and Institute of Electrical and Electronics Engineers (IEEE) 1194 interface technologies. Other external drive connection technologies are within contemplation of the subject disclosure.

The drives and their associated computer-readable storage media can provide nonvolatile storage of data, data structures, computer-executable instructions, and so forth. For the computer 1102, the drives and storage media can accommodate the storage of any data in a suitable digital format. Although the description of computer-readable storage media above refers to a HDD, a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods of the specification.

Many program modules can be stored in the drives and RAM 1112, including an operating system 1130, one or more application programs 1132, other program modules 1134 and program data 1136. All or portions of the operating system, applications, modules, and/or data can also be cached in the RAM 1112. It is appreciated that the specification can be implemented with various commercially available operating systems or combinations of operating systems.

A user can enter commands and information into the computer 1102 through one or more wired or wireless input devices, e.g., a keyboard 1138 and/or a pointing device, such as a mouse 1140 or a touch screen or touchpad (not illustrated). These and other input devices can be connected to the processing unit 1104 through an input device interface 1142 that is coupled to the system bus 1108, but can be connected by other interfaces, such as a parallel port, an IEEE 1194 port, a game port, a USB port, an infrared (IR) interface, etc. A monitor 1144 or other type of display device can also be connected to the system bus 1108 via an interface, such as a video adapter 1146.

The computer 1102 can operate in a networked environment using logical connections via wired and/or wireless communications to one or more remote computers, such as a remote computer(s) 1148. The remote computer(s) 1148 can be a workstation, a server computer, a router, a personal computer, portable computer, microprocessor-based entertainment appliance, a peer device or other common network node, and can include many or all the elements described relative to the computer 1102, although, for purposes of brevity, only a memory/storage device 1150 is illustrated. The logical connections depicted include wired/wireless connectivity to a local area network (LAN) 1152 and/or larger networks, e.g., a wide area network (WAN) 1154. Such LAN and WAN networking environments can be commonplace in offices and companies, and facilitate enterprise-wide computer networks, such as intranets, all of which can connect to a global communications network, e.g., the Internet.

When used in a LAN networking environment, the computer 1102 is connected to the local network 1152 through a wired and/or wireless communication network interface or adapter 1156. The adapter 1156 can facilitate wired or wireless communication to the LAN 1152, which can also include a wireless access point disposed thereon for communicating with the wireless adapter 1156.

When used in a WAN networking environment, the computer 1102 can include a modem 1158, or is connected to a communications server on the WAN 1154, or has other means for establishing communications over the WAN 1154, such as by way of the Internet. The modem 1158, which can be internal or external and a wired or wireless device, can be connected to the system bus 1108 via the serial port interface 1142. In a networked environment, program modules depicted relative to the computer 1102, or portions thereof, can be stored in the remote memory/storage device 1150. It will be appreciated that the network connections shown are example and other means of establishing a communications link between the computers can be used.

The computer 1102 can be operable to communicate with any wireless devices or entities operatively disposed in wireless communication, e.g., desktop and/or portable computer, server, communications satellite, etc. This includes at least Wireless Fidelity (Wi-Fi) and BLUETOOTH wireless technologies. Thus, the communication can be a predefined structure as with a conventional network or simply an ad hoc communication between at least two devices.

Wi-Fi can allow a connection to the Internet from a couch at home, a bed in a hotel room, or a conference room at work, without wires. Wi-Fi can be a wireless technology similar to that used in a cell phone that enables such devices, e.g., computers, to send and receive data indoors and out; anywhere within the range of a base station. Wi-Fi networks can use radio technologies called IEEE 802.11 (a, b, g, n, etc.) to provide secure, reliable, fast wireless connectivity. A Wi-Fi network can be used to connect computers to each other, to the Internet, and to wired networks (which can use an IEEE 802.3 standard or Ethernet). Wi-Fi networks can operate in the unlicensed 5 GHz radio band at a 54 Mbps (802.11a) data rate, and/or a 2.4 GHz radio band at an 9 Mbps (802.11b), a 54 Mbps (802.11g) data rate, or up to a 600 Mbps (802.11n) data rate for example, or with products that contain both bands (dual band), so the networks can provide real-world performance similar to the basic "10BaseT" wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. In an aspect, when a processor executes instructions to perform "operations", this could include the processor performing the operations directly and/or facilitating, directing, or cooperating with another device or component to perform the operations.

In the subject specification, terms such as "data store," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile memory, or can include both volatile and nonvolatile memory. By way of illustration, and not limitation, nonvolatile memory can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated aspects of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement one or more aspects of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
   a processor; and
   a memory that stores executable instructions that, when executed by the processor, facilitate performance of operations, comprising:
   receiving an indication that a first callback computer component has been invoked to register a first component to receive messages corresponding to a first class name, the first class name comprising an object oriented format;
   identifying a first event channel for a first string that corresponds to the first class name; and
   invoking the first callback computer component to send a first notification of a first event to the first component in response to receiving the first notification of the first event at the first event channel.

2. The system of claim 1, wherein the receiving the indication that the first callback computer component has been invoked to receive messages corresponding to the first class name comprises:
   determining that the first callback computer component accepts a first parameter that corresponds to the first event channel to which is being subscribed.

3. The system of claim 1, wherein the receiving the indication that the first callback computer component has been invoked to receive messages corresponding to the first class name comprises:
   determining that the first callback computer component accepts a first parameter that corresponds to a first superclass of the first class name.

4. The system of claim 1, wherein the operations further comprise:
   sending a second notification of the first event to a second component, the second component having subscribed to a superclass event channel of the first event channel.

5. The system of claim 1, wherein the first event channel is part of a message bus that is configured to permit subscribing and publishing to a plurality of event channels that includes the first event channel using a plurality of strings that includes the first string.

6. The system of claim 1, wherein the first notification of the first event comprises a first object of a first class that matches the first class name.

7. The system of claim 1, wherein the operations further comprise:
   in response to receiving a first message indicative of adding a second event channel to the system, restarting, by the system, a message bus component of the system.

8. A method, comprising:
   receiving, by a system comprising a computer component, an indication of registering a first callback component to receive messages corresponding to a first class name, the first class name comprising an object oriented (OO) format;
   identifying, by the system, a first event channel for a first string that corresponds to the first class name; and
   invoking, by the system, the first callback computer component to send a first notification of a first event to the first component in response to receiving the first notification of the first event at the first event channel.

9. The method of claim 8, further comprising:
   in response to receiving a first message indicative of adding a second event channel to the system, restarting, by the system, a message bus component of the system.

10. The method of claim 8, further comprising:
    in response to restarting a message bus component of the system, performing, by the system, the identifying the first event channel for the first string that corresponds to the first class name again.

11. The method of claim 8, wherein the first notification of the first event corresponds to a first OO class, and further comprising:
    sending, by the system, the first event to a second component that subscribes to a second event channel, the second event channel corresponding to a first OO superclass of the first OO class.

12. The method of claim 11, further comprising:
    sending, by the system, the first notification of the first event to a third component that subscribes to a third event channel, the third event channel corresponding to a first OO superclass of the first OO class.

13. The method of claim 8, further comprising:
    creating, by the system, a first event listener that corresponds to the first event channel for a first fully-qualified name of the first class name; and
    creating, by the system, a second event listener that corresponds to a second event channel for a second class name, wherein the second class name comprises a child class of the first class name.

14. The method of claim 13, wherein the creating the second event listener comprises:
    recursively examining a set of at least one subclasses of the first class name that comprises the second class name.

15. A non-transitory computer-readable storage medium comprising instructions that, in response to execution, cause a system comprising a processor to perform operations, comprising:
    registering a first callback component to receive messages corresponding to a first class name, the first class name comprising an object oriented format;
    identifying a first event channel for a first string that corresponds to the first class name; and
    invoking the first callback computer component to send a first notification of a first event to the first component in response to receiving the first notification of the first event at the first event channel.

16. The non-transitory computer-readable storage medium of claim 15, wherein the operations further comprise:
    recompiling and restarting a component that performs the registering in response to adding a second class name not currently recognized as valid.

17. The non-transitory computer-readable storage medium of claim 16, wherein the operations further comprise:
    redoing at least one assignment between a group of at least one component that includes the first callback component and a group of at least one event channels that includes the first event channel.

18. The non-transitory computer-readable storage medium of claim 16, wherein the operations further comprise:
    performing type checking on whether a second class name for the first event matches the first class name while performing the recompiling.

19. The non-transitory computer-readable storage medium of claim 18, wherein the operations further comprise:
    halting the recompiling in response to identifying a type-checking error while performing the type checking.

20. The non-transitory computer-readable storage medium of claim 18, wherein the performing type checking comprises:
  determining that the first callback component has provided a computer component that is able to accept an argument that corresponds to the first event channel.

* * * * *